(12) United States Patent
Gifford

(10) Patent No.: US 10,190,697 B2
(45) Date of Patent: Jan. 29, 2019

(54) STUFFING BOX LUG

(71) Applicant: Mueller International, LLC, Atlanta, GA (US)

(72) Inventor: Paul Gifford, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 165 days.

(21) Appl. No.: 15/171,686

(22) Filed: Jun. 2, 2016

(65) Prior Publication Data

US 2016/0356390 A1 Dec. 8, 2016

Related U.S. Application Data

(60) Provisional application No. 62/171,569, filed on Jun. 5, 2015.

(51) Int. Cl.
  *F16K 43/00* (2006.01)
  *F16K 27/04* (2006.01)
  *F16K 41/02* (2006.01)

(52) U.S. Cl.
  CPC .......... *F16K 27/04* (2013.01); *F16K 27/047* (2013.01); *F16K 41/023* (2013.01)

(58) Field of Classification Search
  CPC .... F16K 27/04; F16K 41/02; Y10T 137/6069; Y10T 137/6072; Y10T 137/6109
  USPC .... 137/315.28, 315.29, 315.41, 315.42, 328; 251/193, 214, 326
  See application file for complete search history.

(56) References Cited

U.S. PATENT DOCUMENTS

| 1,349,062 | A |   | 8/1920 | Goldberg |   |
|---|---|---|---|---|---|
| 1,996,192 | A | * | 4/1935 | Daniel | F15D 1/0005 137/315.29 |
| 2,373,020 | A | * | 4/1945 | Doster | F16K 41/02 137/315.28 |
| 2,685,465 | A | * | 8/1954 | Ratigan | E21B 33/08 277/329 |
| 3,071,342 | A | * | 1/1963 | Allen | F16K 3/12 251/171 |
| 3,104,554 | A |   | 9/1963 | Mueller et al. |   |
| 4,141,378 | A | * | 2/1979 | Wegner | F16K 27/044 137/315.29 |
| 4,405,113 | A | * | 9/1983 | Erwin | F16K 3/184 137/246.22 |
| 5,743,288 | A | * | 4/1998 | Mosman | F16K 41/02 137/315.28 |
| 6,014,984 | A | * | 1/2000 | Schmitz | B25B 13/04 137/315.01 |

(Continued)

OTHER PUBLICATIONS

Gifford, Paul; International Search Report and Written Opinion for PCT Application No. PCT/US16/35686, filed May 3, 2016, dated Sep. 1, 2016, 9 pgs.

(Continued)

*Primary Examiner* — Reinaldo Sanchez-Medina
(74) *Attorney, Agent, or Firm* — Taylor English Duma LLP

(57) ABSTRACT

A valve assembly can include a valve body and a stuffing box attached to the valve body, the stuffing box comprising a stuffing box body and a lifting lug extending from the stuffing box body. A method for lifting a valve assembly can include attaching a lifting mechanism to a lifting lug of the valve assembly and lifting the valve assembly with the lifting mechanism.

15 Claims, 10 Drawing Sheets

(56) References Cited

U.S. PATENT DOCUMENTS

| | | | | |
|---|---|---|---|---|
| 6,029,684 | A * | 2/2000 | Watts | E03F 5/02 |
| | | | | 137/15.19 |
| 6,581,977 | B1 * | 6/2003 | Dole | F16L 17/04 |
| | | | | 285/112 |
| 7,757,706 | B2 * | 7/2010 | Coscarella | F16K 15/03 |
| | | | | 137/315.16 |
| 2012/0280163 | A1 * | 11/2012 | Lunder | E03F 7/02 |
| | | | | 251/326 |
| 2013/0314239 | A1 | 11/2013 | Clark et al. | |

OTHER PUBLICATIONS

Mueller Co, LLC; Brochure entitled: "Transformational 350PSI Resilient Wedge Gate Valve Brochure", Feb. 21, 2015, retrieved from the internet Aug. 14, 2016, <http://www.muellercompany.com/News/Details.aspx?id=1143>, 10 pgs.

Gifford, Paul; PCT Application entitled: Stuffing Box Lug, having serial No. PCT/US16/35686, filed Jun. 3, 2016, 26 pgs.

Gifford, Paul; Provisional Patent Application entitled: Stuffing Box Lug having U.S. Appl. No. 62/171,569, filed May 5, 2015, 21 pgs.

Mueller Co.; Brochure for 350 psi Resilient Wedge Gate Valves, publicly available prior to Jun. 2, 2016, 4 pgs.

Mueller Co.; Operating Instructions: Resilient Wedge Gate Valve Application & Maintenance, publicly available prior to Jun. 2, 2016, 12 pgs.

Mueller Co.; Product Catalog for Mueller 2360 Series—Resilient Wedge Gate Valve, publicly available prior to Jun. 2, 2016, 64 pgs.

Gifford, Paul; International Preliminary Report on Patentability for PCT Application No. PCT/US16/35686, filed Jun. 3, 2016, dated Dec. 14, 2017, 8 pgs.

\* cited by examiner

STUFFING BOX LUG

REFERENCE TO RELATED APPLICATIONS

This application claims the benefit of U.S. Provisional Application No. 62/171,569, filed Jun. 5, 2015, which is hereby specifically incorporated by reference herein in its entirety.

TECHNICAL FIELD

This disclosure relates to valves used in fluid systems. More specifically, this disclosure relates to valves comprising a lifting lug.

BACKGROUND

Valve assemblies are used to regulate or control the flow of material in a fluid system by opening, closing, or partially obstructing various passageways. Valve assemblies, in particular for large diameter pipes such as pipe mains, can be heavy and therefore it can be difficult to lift an entire valve assembly or components of the valve assembly, such as during servicing, installation, or removal of the valve assembly or components of the valve assembly.

SUMMARY

In one aspect of the current disclosure, disclosed is a valve assembly comprising: a valve body; and a stuffing box attached to the valve body, the stuffing box comprising a stuffing box body and a lifting lug extending from the stuffing box body.

In another aspect of the current disclosure, also disclosed is a stuffing box for a valve assembly comprising: a stuffing box body and a lifting lug extending from the stuffing box body.

In another aspect of the current disclosure, also disclosed is a method for lifting a valve assembly, the valve assembly comprising a valve body and a stuffing box attached to the valve body, the stuffing box comprising a stuffing box body and a lifting lug extending from the stuffing box body, the method comprising: attaching a lifting mechanism to the lifting lug of the valve assembly; and lifting the valve assembly with the lifting mechanism.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
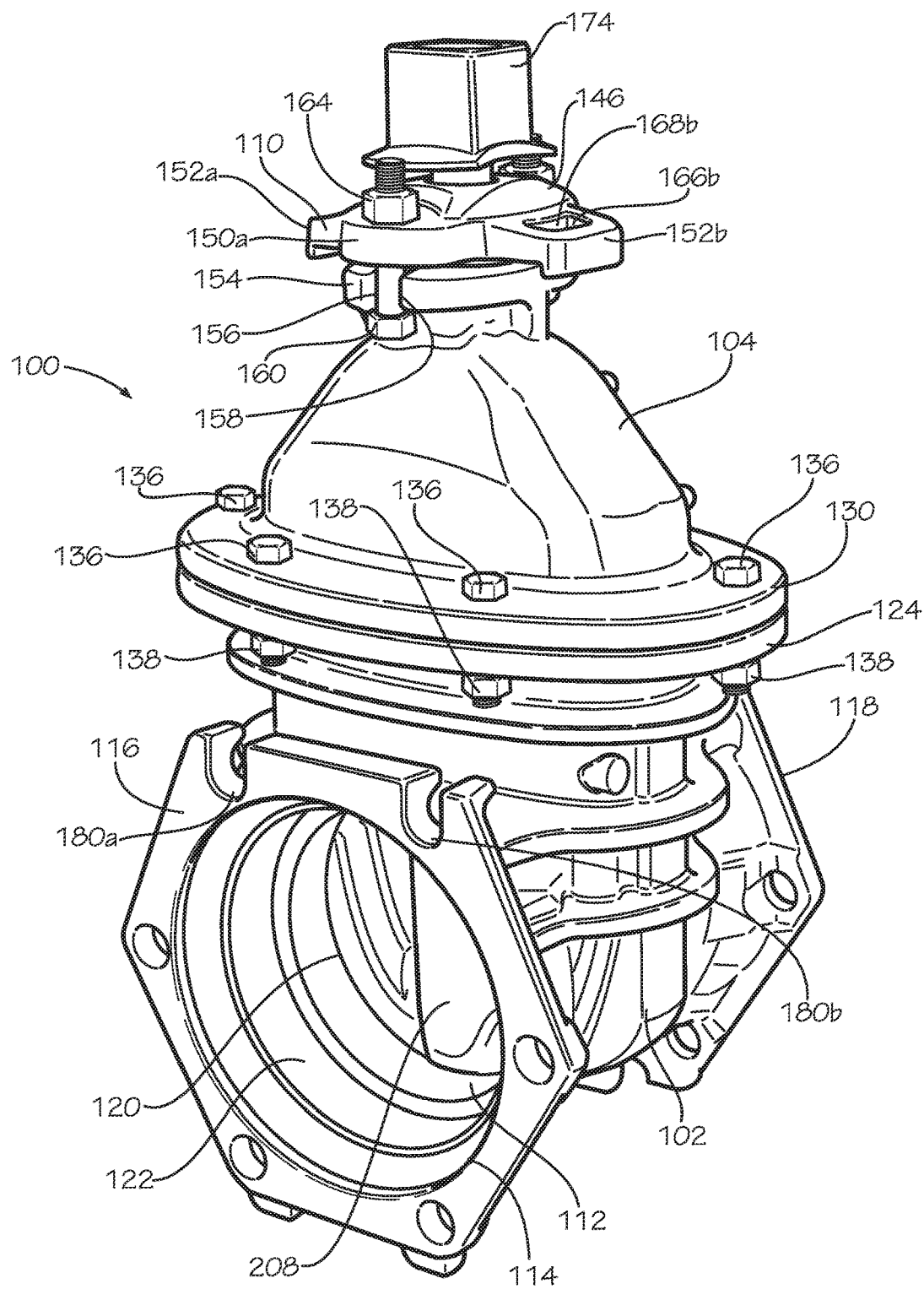
FIG. 1 is a perspective view of a valve assembly including a body, a bonnet, and a stuffing box according to examples of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known embodiment. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can include two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

Disclosed is a valve assembly including a valve body, and a stuffing box connected to the valve body, the stuffing box including a stuffing box body and a lifting lug extending from the stuffing box body, the lifting lug defining a lifting bore having a closed-shape profile.

Also disclosed is a valve assembly including a valve body and a stuffing box connected to the valve body, the stuffing box including a stuffing box body, a first lifting lug extending from the stuffing box body and defining a first lifting bore having a closed-shape profile, and a second lifting lug extending from the stuffing box body and defining a second lifting bore having a closed-shape profile.

Also disclosed is a stuffing box including a stuffing box body and a lifting lug extending from the stuffing box body, the lifting lug defining a lifting bore having a closed-shape profile.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

Figure 2:
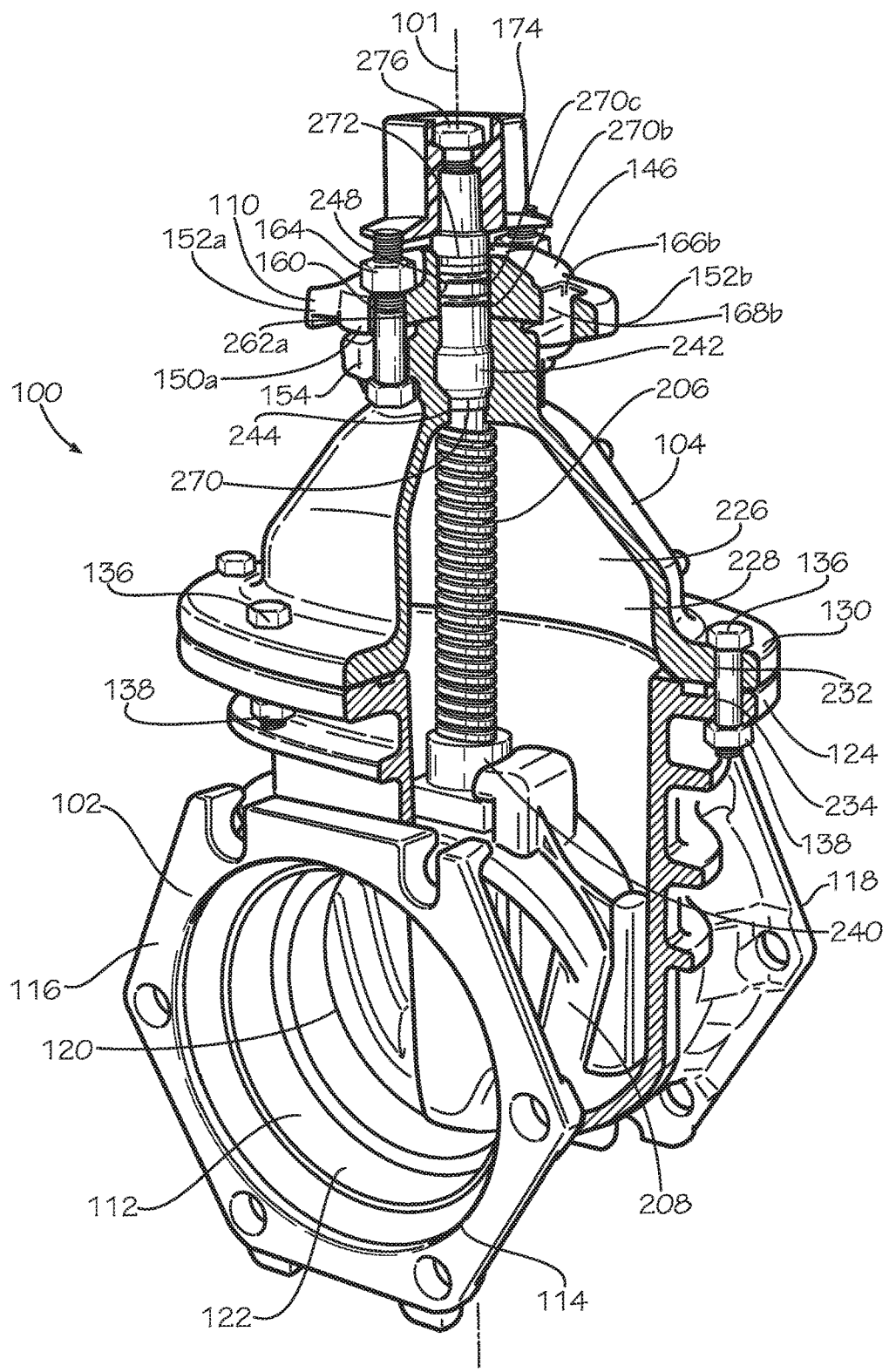
FIG. 2 is a perspective partial cross-sectional view of the valve assembly of FIG. 1 according to examples of the current disclosure.

A valve assembly 100 including a valve body 102, a bonnet 104, a stem 206 (shown in FIG. 2), a gate 208, and a stuffing box 110 is illustrated in FIGS. 1 and 2. The valve body 102 includes an interior 112 which is substantially continuous through the body 102 from an inlet 114 at a first end 116 to an outlet (not shown) at a second end 118. The interior 112 defines a valve cavity 120 and a fluid bore 122. The valve cavity 120 and fluid bore 122 allow fluid flow through the body 102 such that in operation, fluid flows in the inlet 114, through the valve cavity 120 and fluid bore 122, and out the outlet. The valve body 102 includes a valve flange 124 which the bonnet 104 is secured to in various examples. In examples, portions of the valve assembly 100 such as the valve body 102, the bonnet 104, and the stuffing box 110 may be constructed from cast iron, ductile iron, or other similar materials.

As illustrated in FIG. 1, in various examples, the valve body 102 includes two anti-rotation notches 180a,b; however, the number of anti-rotation notches 180 should not be considered limiting on the current disclosure, as in various other examples any desired number of anti-rotation notches 180, including zero anti-rotation notches 180, may be present. In various examples, the anti-rotation notches 180 may prevent T-bolts, such as T-bolt 482 (shown in FIG. 4), from rotating during pipe installation. The anti-rotation notches 180 may hold the head of the T-bolt 482 in place while tightening of the T-bolt 482 such that the operator does not have to hold the head of the T-bolt 482 in place.

The gate 208 is housed within the body 102 in the valve cavity 120. The stem 206 is connected to the gate 208 such that movement of the stem 206 moves the gate 208 to permit or restrict fluid flow through the body 102. When the gate 208 is in an open position, fluid is allowed to flow through the interior 112 of the valve body 102. When the gate 208 is in a closed position, the gate 208 disrupts fluid flow through the valve body 102 and prevents fluid flow from the inlet 114 to the outlet. The disclosure of the valve assembly 100 with the gate 208 should not be considered limiting on the current disclosure as in various other examples, the valve assembly 100 may be any desired type of valve assembly including, but not limited to, ball valves, butterfly valves, disc valves, plug valves, gate valves, or any other desired valve type.

In various examples, the stem 206 is connected to the gate 208 through a stem nut 240; however, the disclosure of the stem nut 240 should not be considered limiting on the current disclosure, as in various other examples, the stem 206 may be connected to the gate 208 through any suitable connecting mechanism. As illustrated in FIG. 2, in various examples, the stem 206 includes a thrust collar 242. In various examples, the thrust collar 242 is utilized to retain the stem 206 with the valve assembly 100 when a stuffing box 110, described in greater detail below, is secured to the bonnet 104.

The bonnet 104 includes an interior 226 defining a bonnet cavity 228 in various examples. The bonnet 104 may be mounted on the valve body 102. As illustrated in FIG. 2, in various examples, the bonnet 104 includes a bottom bonnet flange 130. The bottom bonnet flange 130 defines bottom bonnet flange bores 232 and the valve flange 124 defines valve flange bores 234 in various examples. As illustrated in FIG. 2, the bonnet 104 is mounted on the valve body 102 such that the bonnet cavity 228 is in fluid communication with the valve cavity 120 and the bottom bonnet flange bores 232 are aligned with the valve flange bores 234. Securing mechanisms, such as bolts 136 and nuts 138, are utilized with the bottom bonnet flange bores 232 and valve flange bores 234 to secure the bonnet 104 to the valve body 102. In various examples, the valve assembly 100 includes a seal, such as an O-ring (not shown) or various other types of seals, to seal the connection between the bonnet 104 and the valve body 102.

As illustrated in FIG. 2, when the bonnet 104 is mounted on the body 102, the stem 206 extends through a stem bore 244 defined in the bonnet 104. In various examples, the bonnet 104 includes a top bonnet flange 154 defining a top bonnet flange bore 156. In various examples, the top bonnet flange 154 includes a flange bore slit 158 such that the top bonnet flange 154 defines a profile with an open shape and does not completely surround a securing mechanism, such as a bolt 160, positioned in the top bonnet flange bore 156. In various other examples, the flange bore slit 158 is omitted and the top bonnet flange 154 has a profile with a closed shape and completely surrounds the bolt 160 within the top bonnet flange bore 156. As used herein, the term closed shape refers to those shapes which substantially enclose a region of space. As used herein, the term open shape refers to those shapes which do not enclose a region of space. In the present example, the bonnet 104 includes two top bonnet flanges 154; however, the number of top bonnet flanges 154 should not be considered limiting on the current disclosure as in various other examples, the bonnet 104 may include one top bonnet flange 154 or a plurality of top bonnet flanges 154.

In various examples, the valve assembly 100 includes the stuffing box 110. The stuffing box 110 may be connected to the bonnet 104. The stuffing box 110 includes a stuffing box body 146 defining a box stem bore 248 extending through the stuffing box body 146. In various examples, the stuffing box 110 includes two securing flanges 150a,b (securing flange 150b shown in FIG. 5) and two lifting lugs 152a,b extending from the stuffing box body 146; however, the number of securing flanges 150 or lifting lugs 152 should not be considered limiting on the current disclosure, as in various other examples, any desired number of securing flanges or lifting lugs 152 may be utilized including one securing flange 150 or lifting lug 152 or a plurality of securing flanges 150 or lifting lugs 152.

Each lifting lug 152a,b can define a lifting bore 166a,b (lifting bore 166a shown in FIG. 3) defined through each lifting lug 152a,b, respectively. Each lifting bore 166a,b can define a profile with a closed shape, such as a rectangle, circle, oval, polygon, or various other closed shapes. In the present example, each lifting bore 166a,b can define a generally oval, rectangular, or capsule shape and can have curved corners and sides as desired; however, in various other examples, the lifting bores 166 may have any desired closed shape. Each lifting bore 166a,b with the closed shape includes a lifting bore surface 168a,b (lifting bore surface 168a shown in FIG. 5) which is substantially continuous through each lifting lug 152a,b, respectively. The number of lifting bores 166 with lifting bore surfaces 168 should not be considered limiting on the current disclosure as in various other examples, any desired number of lifting bores 166 may be utilized such as one lifting bore 166 or a plurality of lifting bores 166.

In various examples, the lifting lugs 152 may aid in alignment and support of a valve box 600 with the valve assembly 100. Valve boxes, which can be cylindrically shaped or have any other desired shape, are enclosures used to protect components of the valve assembly 100 and provide access to components of the valve assembly 100 in various applications, such as access to the operating nut 174 when the valve assembly 100 is underground. The valve box 600 may have an open bottom that may be positioned over the underground component of the valve assembly 100 in various examples, while the top of the valve box 600 is at or near ground level. In various examples, the lifting lugs 152 may interface with the valve box 600 to keep the valve box 600 centered above or about an operating nut 174 and affix the valve box 600 to the lifting lugs 152. In one aspect, the stuffing box 110 can be sized such that a horizontal distance 630 from a vertical axis 101 of the valve, with which a center of the operating nut 174 can be aligned, to a wall 601 of the valve box 600 when the valve box 600 is placed around the valve assembly 100 is the same in every direction. In another aspect, when the valve box 600 is placed around the stuffing box 110, the horizontal distance 630 between the vertical axis 101 and the wall 601 is greater than or equal to a horizontal distance 620 between the vertical axis 101 of the valve assembly 100 and a radially outermost portion of the lifting lugs 152a,b. In such aspect, horizontal shifting of the valve box 600 to a degree that may block access to the operating nut 174 can be prevented. In various examples, a valve box may include brackets, slots, flanged portions, hooks, or various other mechanisms for interfacing with the lifting lugs 152 and affixing the valve box to the lifting lugs 152. In various examples, the lifting lugs 152 can eliminate the need for a valve box adapter (not shown) or valve box aligner (not shown) to connect the valve box 600 with the valve assembly 100 or to center or align the valve box 600 about the operating nut 174.

Figure 3:
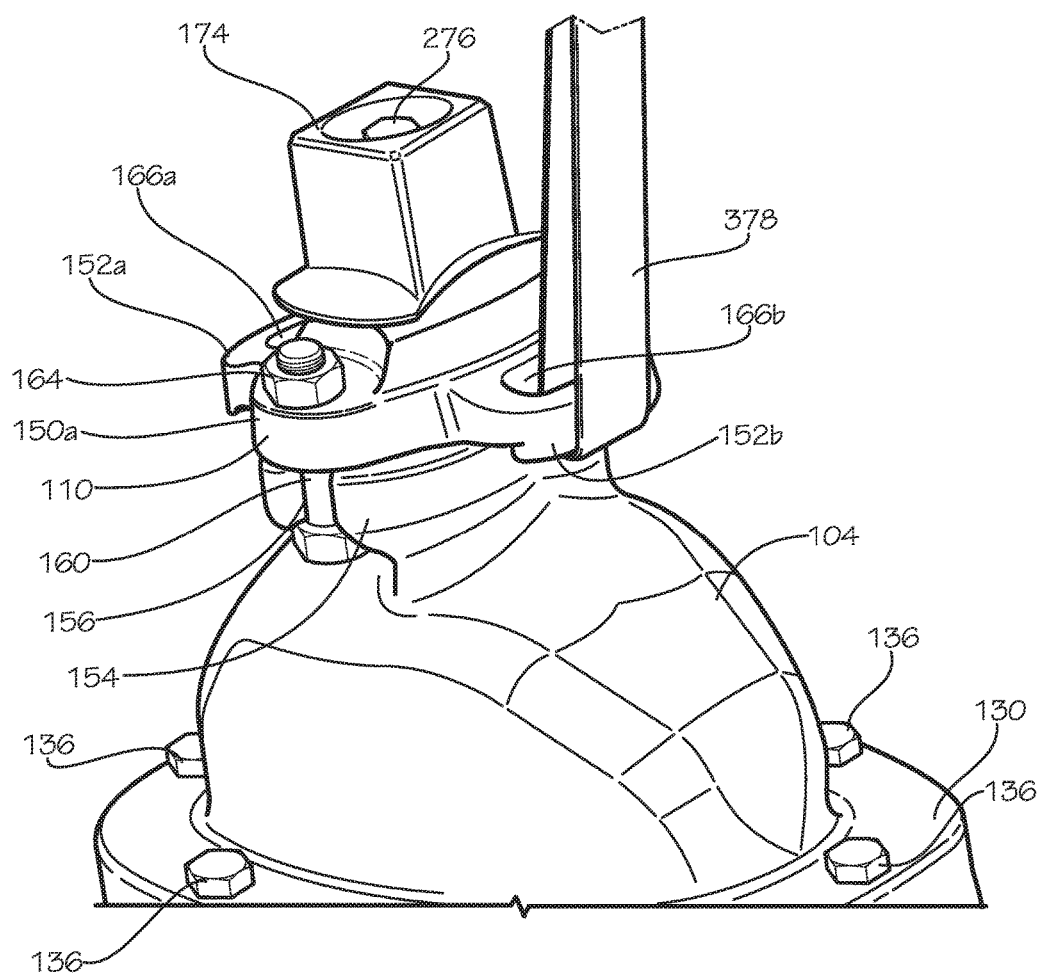
FIG. 3 is a perspective view of the bonnet and stuffing box of the valve assembly of FIG. 1 when the valve assembly is being supported at a lifting lug of the stuffing box by a strap according to examples of the current disclosure.

In various examples, the lifting lugs 152 and lifting bores 166 may be utilized as handles to lift or lower the valve assembly 100 or components of the valve assembly 100, such as stuffing box 110, during installation, removal, or other servicing of the valve assembly 100. For example, as illustrated in FIG. 3, in various examples, the lifting lugs 152 and lifting bores 166 may accommodate a lifting mechanism such as a strap 378. However, the disclosure of the strap 378 as the lifting mechanism should not be considered limiting on the current disclosure as in various other examples, various other lifting mechanisms such as ropes, straps, hooks, chains, a person's hand (or multiple people's hands), or any other mechanism for lifting the entire valve assembly 100 or various components of the valve assembly 100 may be utilized. Because each lifting bore 166 can include the closed-shape profile with the substantially continuous lifting bore surface 168, the lifting lugs 152 are less likely to become disengaged with the lifting mechanism during lifting compared to lifting lugs 152 with lifting bores 166 having an open-shaped profile. In this manner, the lifting lugs 152 and lifting bores 166 may promote worksite safety and enable easier installation and removal of the valve assembly 100.

In various examples, placing the lifting lugs 152 on the stuffing box 110 may be cheaper to manufacture compared to placing the lifting lugs 152 on the bonnet 104. In addition, in various examples, placing the lifting lugs 152 on the stuffing box 110 may also enable the valve assembly 100 to hang straighter and sway less when lifted compared to if the lifting lugs 152 were placed on the bonnet 104 because the lifting lugs 152 are closer to the center of the valve assembly 100. In various examples, it may be easier for an operator to attach a lifting mechanism such as a strap to the lifting lugs 152 on the stuffing box 110 compared to attaching the lifting mechanism to lifting lugs on the bonnet 104. In various examples, placing the lifting lugs 152 on the stuffing box 110 compared to the bonnet 104 may reduce maintenance costs or replacement costs because old bonnet designs may be retrofitted with the stuffing box 110 instead of replacing the entire bonnet with a new bonnet having lifting lugs.

Each securing flange 150a,b defines a securing bore 262a,b (securing bore 262b shown in FIG. 9), respectively. In various examples, the stuffing box 110 is mounted on the bonnet 104 such that the stem 206 extends through the box stem bore 248 and the securing bores 262 are aligned with the top bonnet flange bores 156, respectively. The securing mechanism, such as the bolts 160 with nuts 164, may be utilized with the securing bores 262 and top bonnet flange bores 156 to secure the stuffing box 110 to the bonnet 104. The disclosure of the nuts 164 and the bolts 160 as the securing mechanism should not be considered limiting on the current disclosure as in various other examples, and any suitable securing mechanism may be utilized. As illustrated in FIG. 2, in various examples the stuffing box 110 is secured to the bonnet 104 such that the stem 206 extends through the stem bore 244 of the bonnet 104 and the box stem bore 248 of the stuffing box 110. In various examples, the thrust collar 242 of the stem 206 is positioned between the stuffing box 110 and the bonnet 104 such that the stem 206 is retained to the valve assembly 100.

As illustrated in FIG. 2, in various examples, the stem 206 includes sealing mechanisms, such as three O-rings 270a,b,c, which are utilized to provide a seal between the stem 206 and the bonnet 104 and between the stem 206 and the stuffing box 110. In various examples, the O-ring 270a is positioned on the stem 206 below the thrust collar 242 to form a seal between the stem 206 and the bonnet 104. In various examples, the O-rings 270b,c are positioned on the stem 206 above the thrust collar 242 to form a seal between the stem 206 and the stuffing box 110. In various examples, the valve assembly 100 also may include a dirt sealer 272 on the stem 206; however, the disclosure of the dirt sealer 272 should not be considered limiting on the current disclosure. In various examples, the operator may replace the O-rings 270b,c and the dirt sealer 272 in the field while the valve assembly 100 is integrated with a piping system and under pressure in the fully open position.

The disclosure of the O-rings 270 as the sealing mechanism or the number of the O-rings 270 should not be considered limiting on the current disclosure, as in various other examples, various other types of sealing mechanisms may be utilized and any desired number of sealing mechanisms may be utilized, including no sealing mechanisms.

In various examples, the valve assembly 100 also includes an operating nut 174 connected to the stem 206 through a securing mechanism, such as an operating nut cap screw 276; however, the disclosure of the operating nut cap screw 276 should not be considered limiting on the current disclosure as in various other examples, any suitable securing mechanism may be utilized. In various examples, the operating nut 174 may be utilized to open and close the gate 208 when a tool actuates the operating nut 174, which rotates the stem 206 and thereby moves the gate 208. The disclosure of the operating nut 174 should not be considered limiting on the current disclosure as in various other examples, any suitable mechanism for rotating the stem 206 may be utilized, such as a hand wheel or a motorized actuator.

As illustrated in FIG. 3, the strap 378 or other lifting mechanism may be positioned through the lifting bore 166b of the lifting lug 152b. In various other examples, the strap 378 may be positioned through the lifting bore 166a of the lifting lug 152a. In various other examples, the strap 378 may be positioned in the lifting bore 166b and a second strap similar to the strap 378 may be positioned in the lifting bore 166a. The strap 378 may be utilized to lift the entire valve assembly 100 or components of the valve assembly 100 such as the bonnet 104 and the stuffing box 110 or only the stuffing box 110. The operator may selectively remove the nuts 138, the bolts 136, the nuts 164, or the bolts 160 to selectively lift various components of the valve assembly 100 through the lifting lugs 152.

Figure 4:
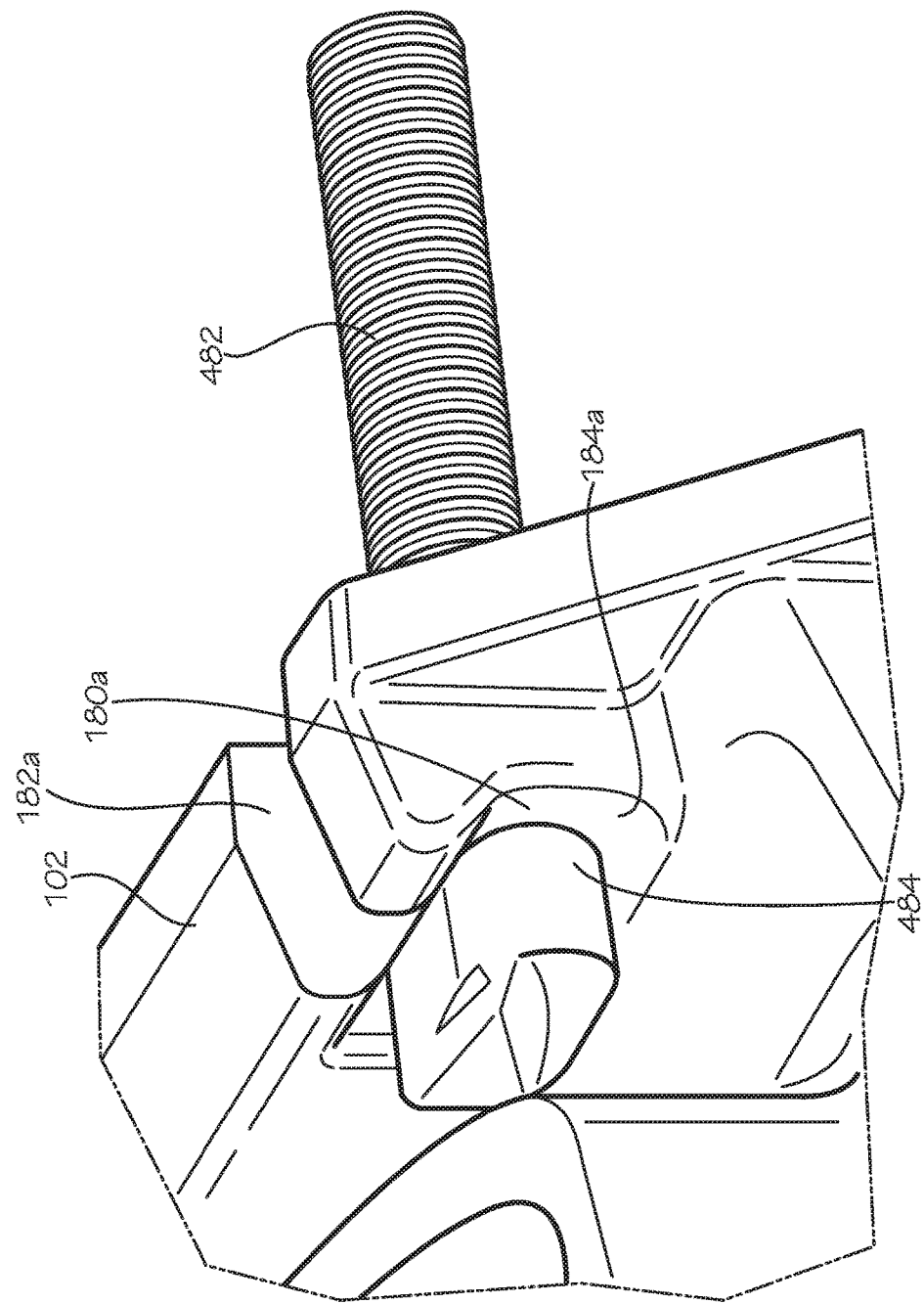
FIG. 4 shows a perspective view of an anti-rotation notch of the body of FIG. 1.

FIG. 4 shows a detailed view of the anti-rotation notch 180a. Each of the anti-rotation notches 180a,b can comprise a first portion 182a,b (first portion 182b shown in FIG. 6), which can be a clearance portion, and a second portion 184a,b (second portion 184b shown in FIG. 7), which can be an anti-rotation portion. As illustrated in FIG. 4, the anti-rotation notch 180a is adapted to hold a head 484 of the T-bolt 482 in place inside the second portion 184a such that the T-bolt 482 does not rotate during installation. In one aspect, rotation of T-bolt 482 is prevented due to the convex shape of the second portion 484a against which the head 484 of the T-bolt 482 is made to contact, and yet the T-bolt 482 is still easily installed or removed from the anti-rotation notch 180a through the first portion 182a when disconnected. In various examples without the anti-rotation notch 180a, the T-bolt 482 may wander or otherwise move during tightening during pipe installation. The shape of the anti-rotation notches 180 should not be considered limiting on the current disclosure as the anti-rotation notches 180 may have any desired shape suitable for securing the head 484 of the T-bolt 482 in various examples.

Figure 5:
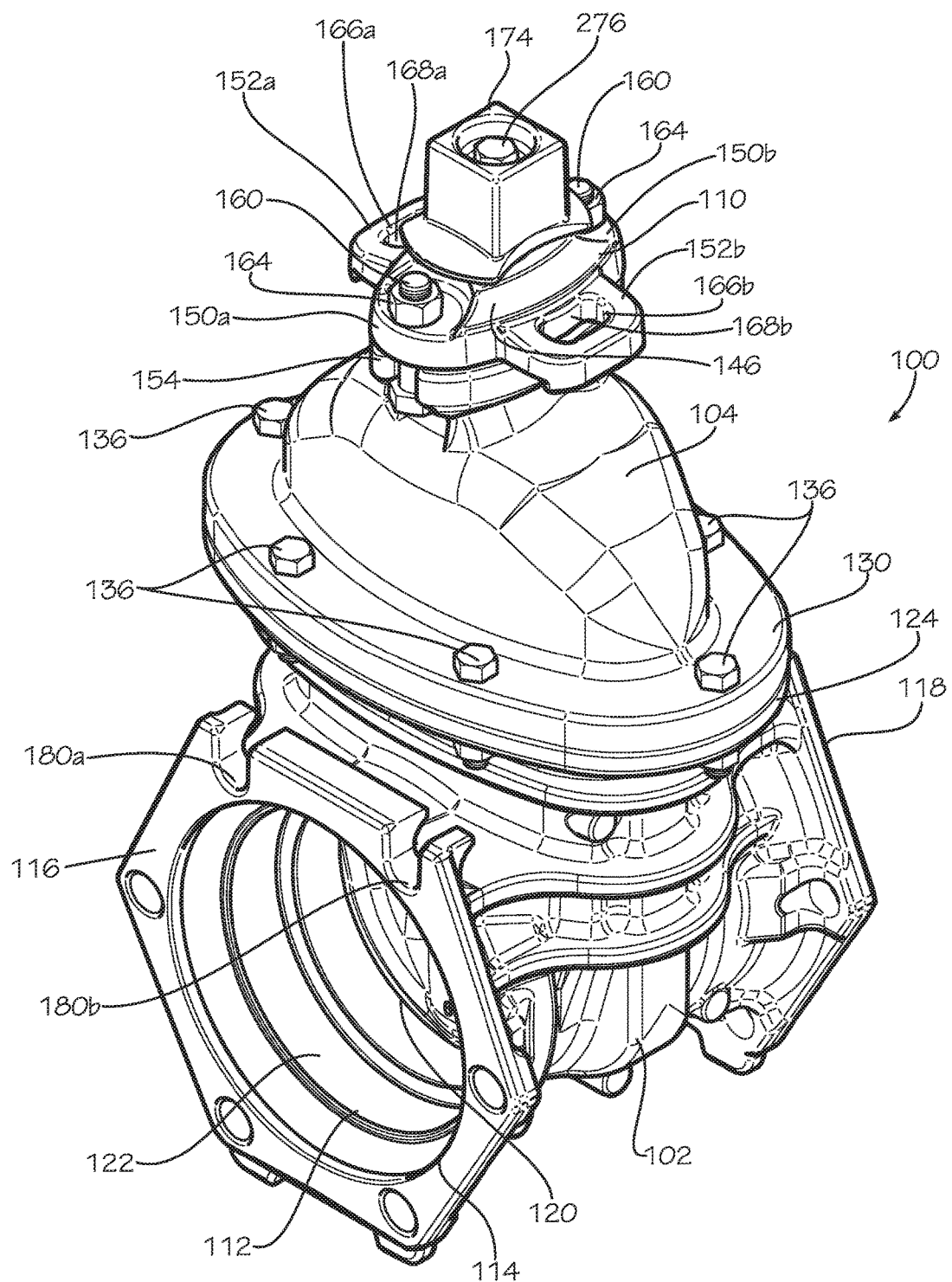
FIG. 5 is another perspective view of the valve assembly of FIG. 1 according to examples of the current disclosure.
Figure 6:
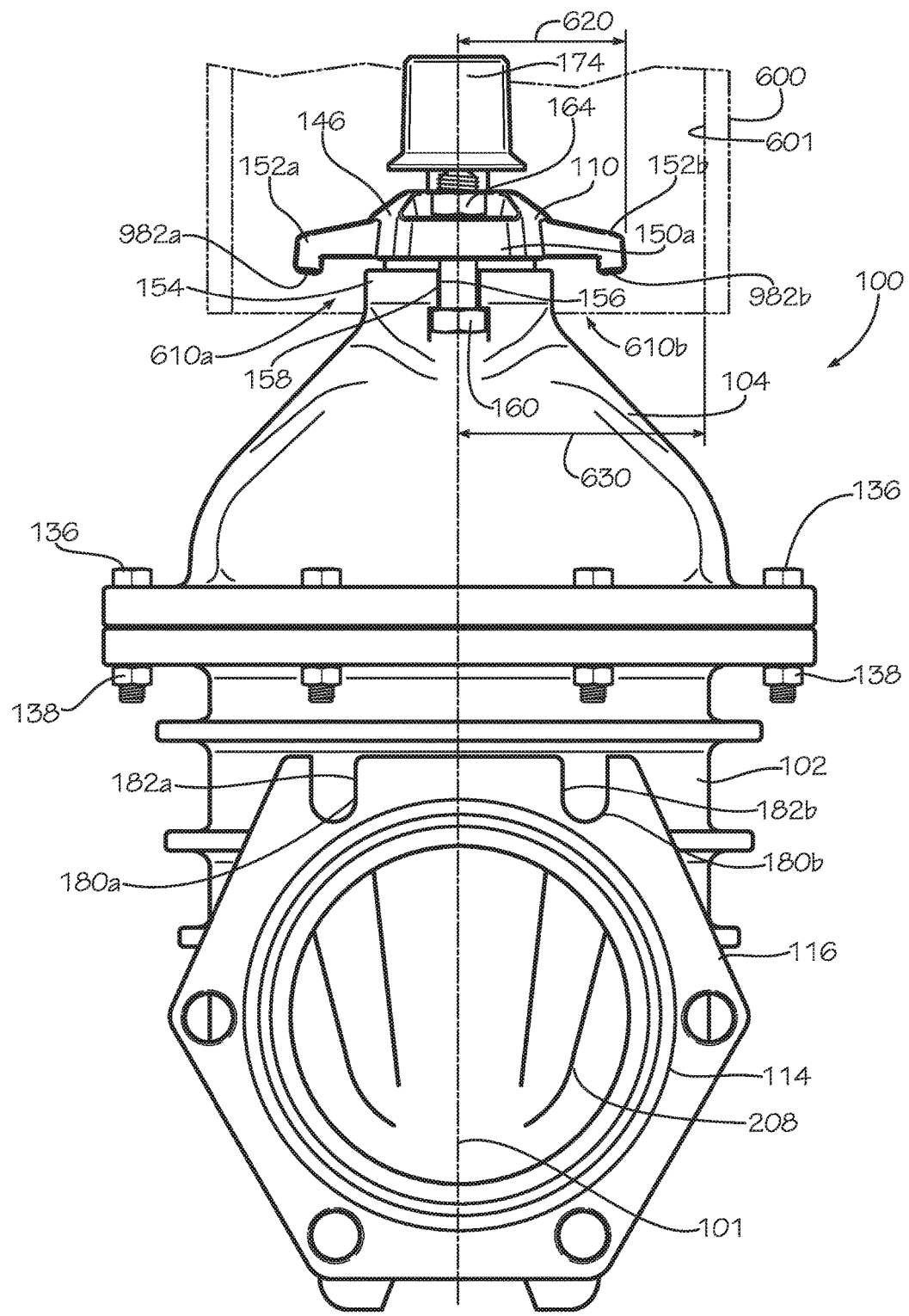
FIG. 6 is a front view of the valve assembly of FIG. 1 according to examples of the current disclosure.

FIG. 5 shows a top perspective view of the valve assembly 100, and FIG. 6 shows a front view of the valve assembly 100. As shown in FIG. 6, the lifting lugs 152a,b can be shaped so that no surface of the lifting lugs 152a,b is in contact with any surface of the valve assembly 100. On each side of the valve 100, the lifting lug 152a,b and the bonnet 104 can define a clearance gap 610a,b therebetween for passing of a portion of a lifting mechanism around one or both of the lifting lugs 152a,b. In one aspect, the lifting lugs 152a,b can extend horizontally from the stuffing box body 146 just enough to clear the operating nut 174. In another aspect, the lifting lugs 152a,b can extend further from the stuffing box body 146 than is necessary to clear the operating nut 174. In yet another aspect, a portion of one or both of the lifting lugs 152a,b can be configured not to clear the operating nut 174. In aspect, each of the lifting lugs 152a,b can be offset horizontally from the vertical axis 101 of the valve assembly 100 when the valve assembly 100 is viewed from the front as shown. As shown, each of the lifting lugs 152a,b can include a bottom flange 982a,b, respectively.

Figure 7:
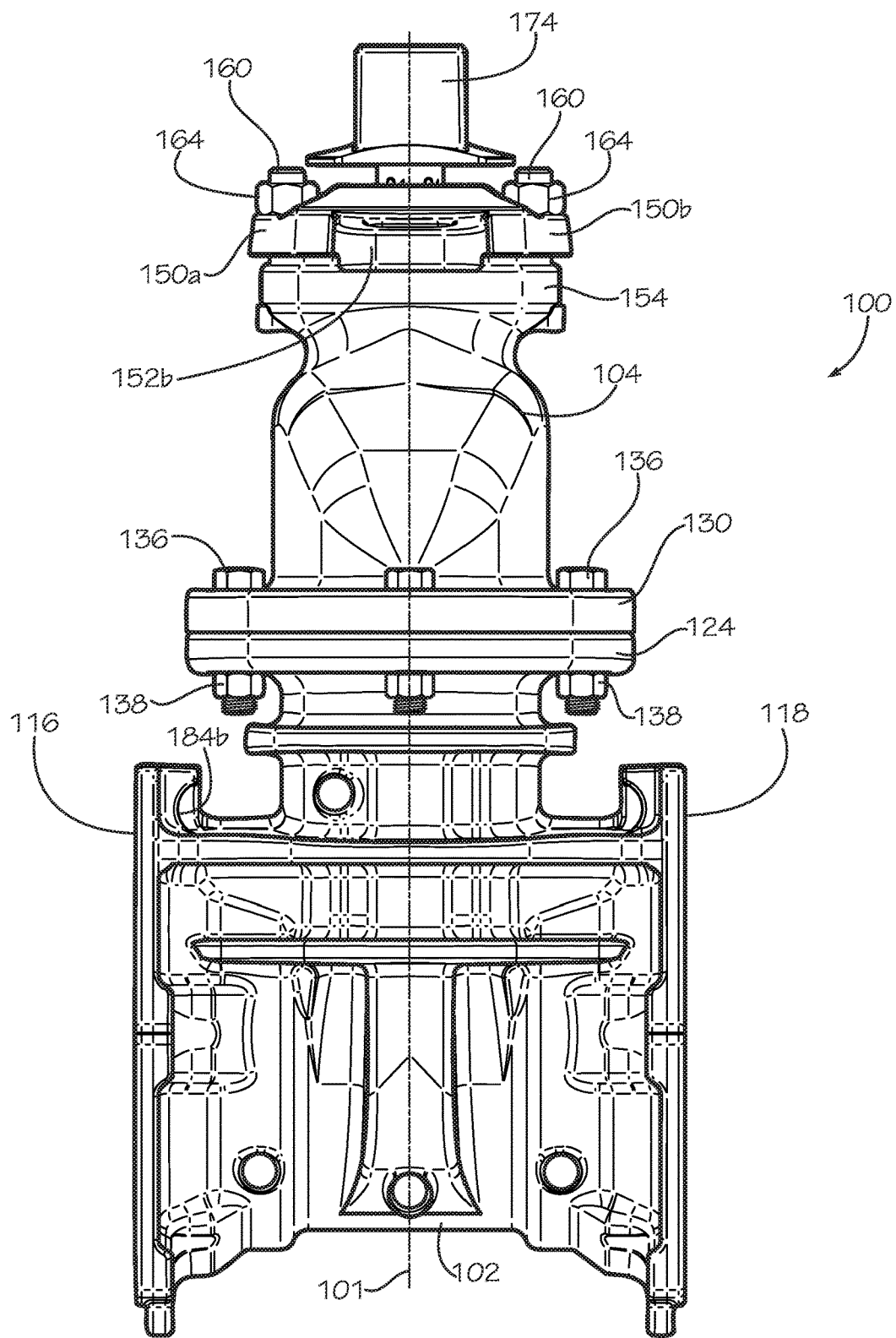
FIG. 7 is a side view of the valve assembly of FIG. 1 according to examples of the current disclosure.

FIG. 7 shows a side view of the valve assembly 100. In one aspect, the stuffing box 110, the lifting lugs 152a,b, and the lifting bores 166a,b can each be aligned along the vertical axis 101 of the valve assembly 100 when the valve assembly 100 is viewed from the side as shown. In another aspect, the stuffing box 110, the lifting lugs 152a,b, or the lifting bores 166a,b can be offset horizontal from the vertical axis 101 of the valve assembly 100 when the valve assembly 100 is viewed from the side as shown. Based on the center of gravity of the valve assembly 100, the lifting lugs 152a,b can be positioned so that lifting the valve assembly at the lifting lugs will result in the vertical axis of the valve assembly 100 remaining vertical during lifting.

Figure 8:
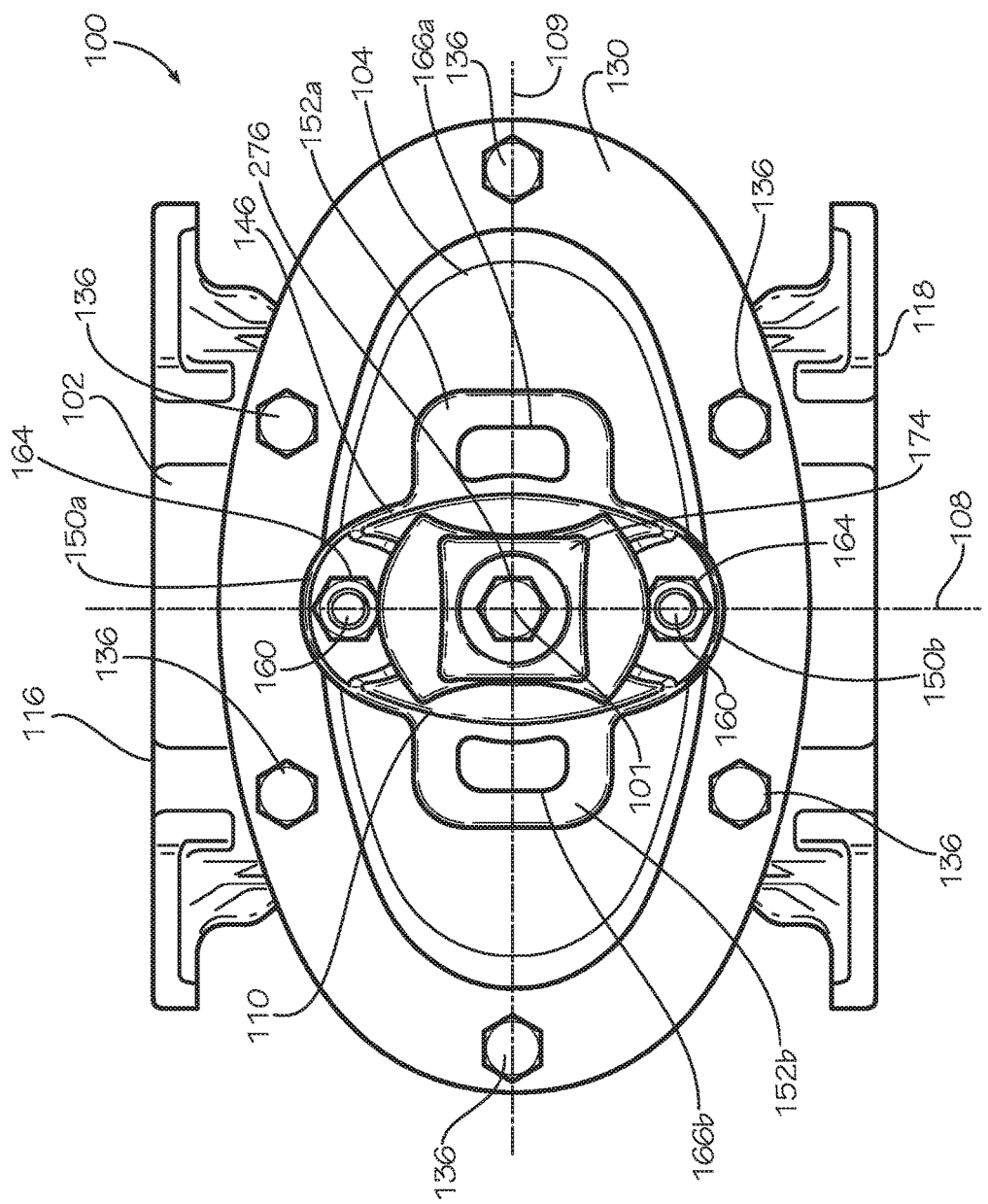
FIG. 8 is a top view of the valve assembly of FIG. 1 according to examples of the current disclosure.

FIG. 8 shows a top view of the valve assembly 100 with, the stuffing box 110 shown aligned along the vertical axis 101 of the valve assembly 100. In one aspect, as shown in FIG. 8, the stuffing box 110 can be made symmetrical about a longitudinal axis 108, and the stuffing box 110 can be made symmetrical about a transverse axis 109. In such aspect, the stuffing box 110 can be made reversible in at least one orientation such that the front and rear of the stuffing box 110 are interchangeable and either the front or the rear of the stuffing box 110 can be attached to the front of the bonnet 104. In another aspect, the stuffing box can be made reversible in another orientation such that the top and the bottom of the stuffing box 110 are interchangeable and can be attached to the bonnet 104 in one of two orientations and either the top or the bottom of the stuffing box 110 can be attached to the top of the bonnet 104. In such aspect, the shape of the bottom of the stuffing box 110 can be reproduced or mirrored at the top of the stuffing box 110 such that flanges (not shown but similar to the bottom flanges 982a,b) extend upwardly from the lifting lugs 152a,b, respectively.

Figure 9:
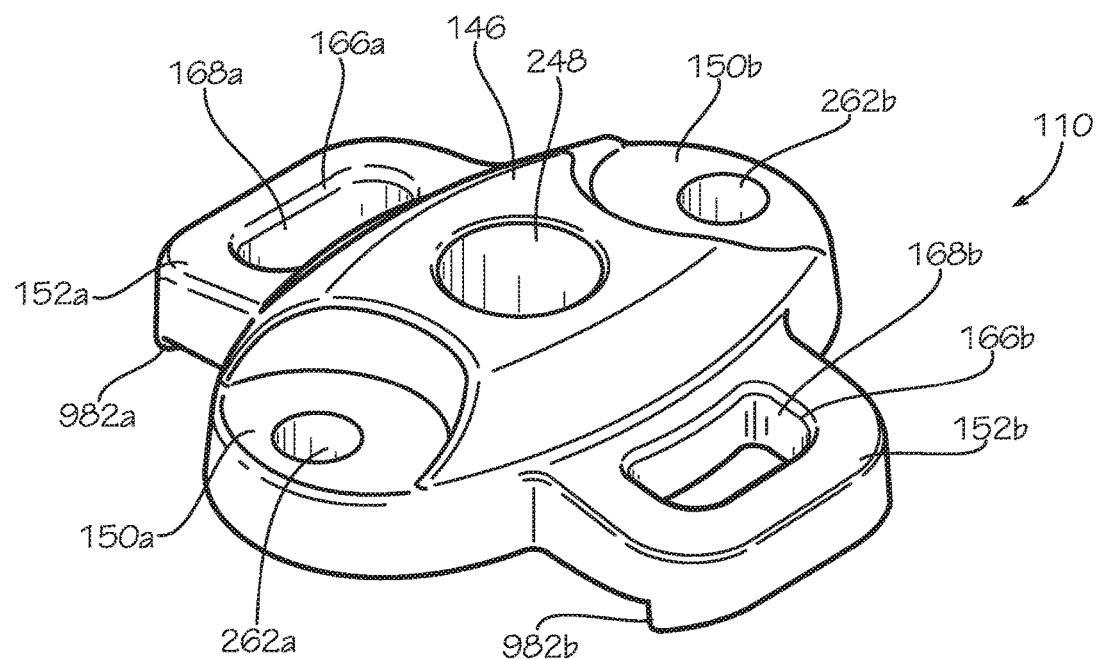
FIG. 9 is a perspective view of the stuffing box of the valve assembly of FIG. 1 according to examples of the current disclosure.
Figure 10:
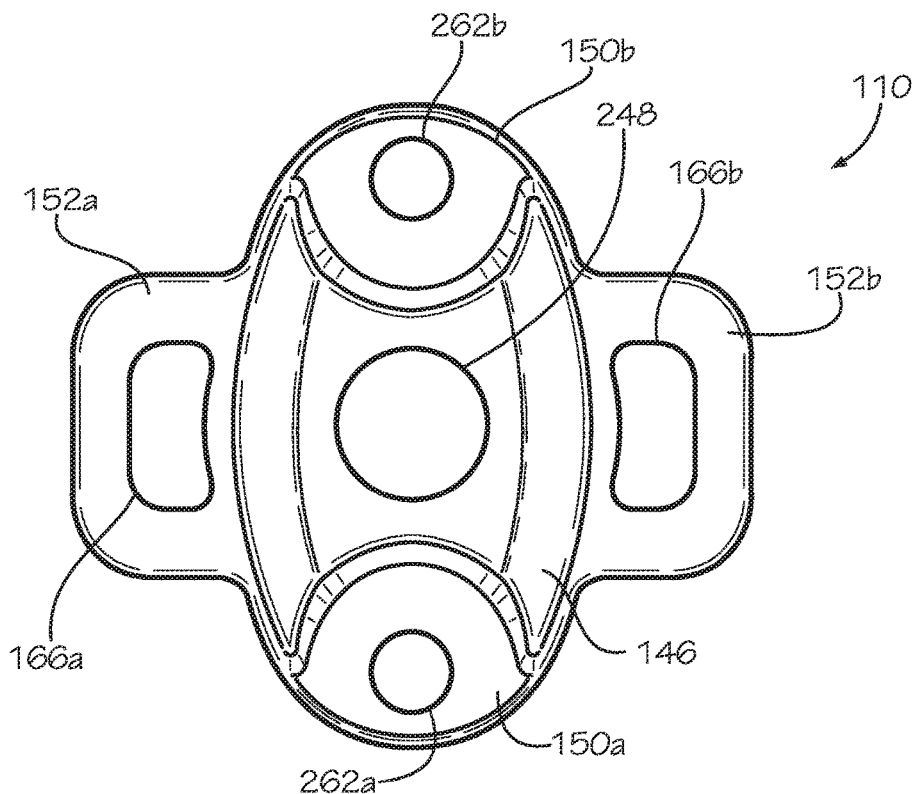
FIG. 10 is a top view of the stuffing box of the valve assembly of FIG. 1 according to examples of the current disclosure.
Figure 11:
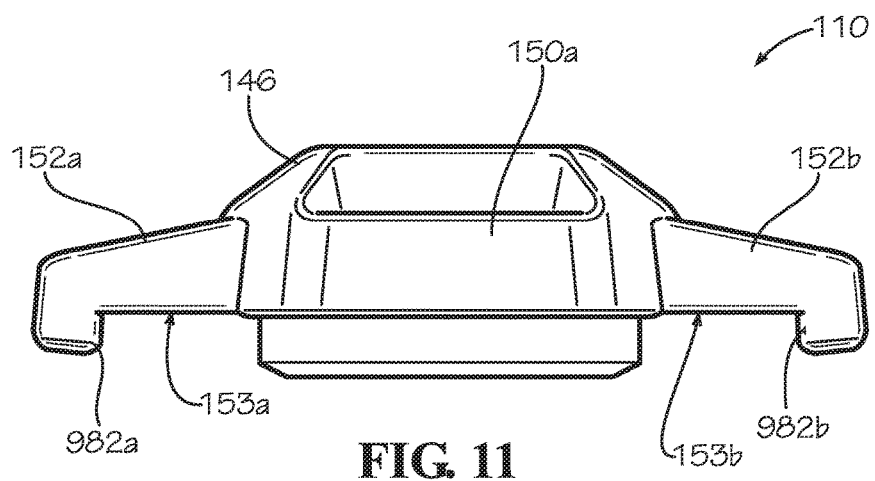
FIG. 11 is a front view of the stuffing box of the valve assembly of FIG. 1 according to examples of the current disclosure.

As illustrated in FIGS. 9-12, in various examples, each lifting lug 152a,b can include the bottom flange 982a,b, respectively. In one aspect, each of the lifting lugs 152a,b can extend outward in a horizontal orientation from the stuffing box body 146. In another aspect, each of the lifting lugs 152a,b can extend outward in a non-horizontal orientation from the stuffing box body 146 such that either of the lifting lugs 152a,b are angled from the horizontal. In one aspect, as shown in FIG. 11, a bottom surface 153a,b of respective lifting lugs 152a,b is not angled with respect to the horizontal. In another aspect, either of the bottom surface 153a,b of the respective lifting lugs 152a,b can be angled with respect to the horizontal. Each of the lifting lugs 152a,b can be angled upward or downward from the horizontal. Such angle can measure, for example and without limitation, any angle between 0 and 90 degrees from the horizontal. FIG. 9 shows a perspective view of the stuffing box 110, in which various edges of the stuffing box 110 can define a radius or fillet.

FIG. 10 shows a top view of the stuffing box 110. In one aspect, each of the lifting lugs 152a,b can have a substantially rectangular shape when viewed from above as shown. In one aspect, each of the lifting bores 166a,b of the respective lifting lugs 152a,b can have a substantially rectangular, oval, or capsule shape when viewed from above as shown. Each of the lifting lugs 152a,b or the lifting bores 166a,b can further define rounded exterior or interior corners, and one or more edges of the lifting lugs 152a,b or the lifting bores 166a,b can be curved or follow or match the shape of the stuffing box body 146. In another aspect, each of the lifting lugs 152a,b or the lifting bores 166a,b can have another shape such as, for example and without limitation, that of a circle or a polygon other than a rectangle.

FIG. 11 shows a front view of the stuffing box 110. In various examples, the bottom flanges 982a,b extend downwardly from the respective bottom surfaces 153a,b of the respective lifting lugs 152a,b. The bottom flanges 982a,b can be used to retain various lifting mechanisms either in the lifting bores 166 or underneath the lifting lugs 152 in various examples. For example and without limitation, the bottom flanges 982a,b can provide extra structure around which a lifting mechanism, including a hook or other lifting mechanism that cannot pass completely through the lifting bores 166a,b due to its size, can be more positively—and in some cases more safely—secured. In one aspect, the bottom flanges 982a,b can have a substantially rectangular shape when viewed from the side as shown. In another aspect, the bottom flanges 982a,b can have a V-shape or a rounded shape or any other desired shape when viewed from the side as shown. In one aspect, the bottom flanges 982a,b can have a substantially rectangular shape when viewed from the bottom. In another aspect, the bottom flanges 982a,b can have a circular shape when viewed from below or can extend further downward to provide structure around which a closed ring or "eye" or other lifting device having a partially or completely closed bore can be positively secured. In one aspect, each of the lifting lugs 152a,b and the bottom flanges 982a,b can comprise non-curved edges (i.e., straight edges) when viewed from the side as shown. In another aspect, each of the lifting lugs 152a,b and the bottom flanges 982a,b can comprise at least one curved edge so as to form a convex or concave shape when viewed from the front as shown.

Figure 12:
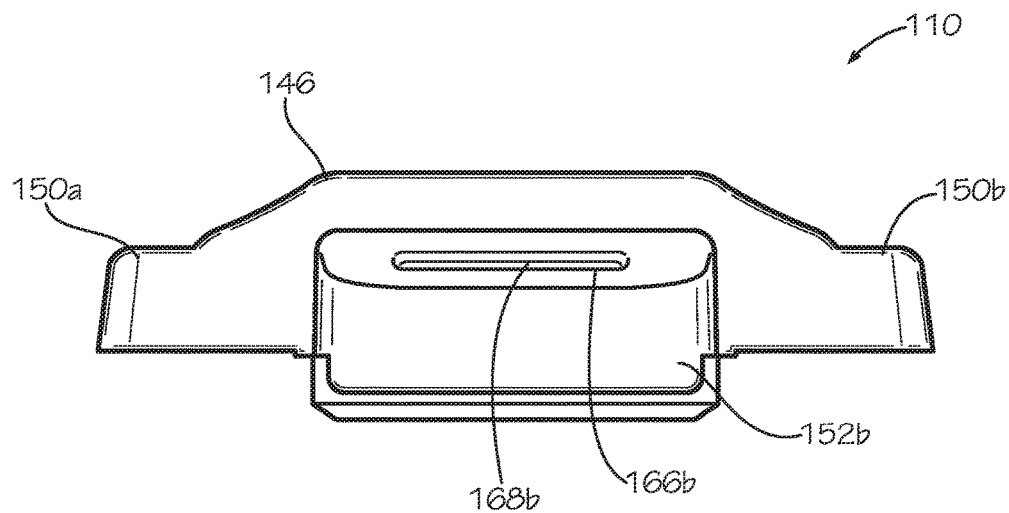
FIG. 12 is a side view of the stuffing box of the valve assembly of FIG. 1 according to examples of the current disclosure.

FIG. 12 shows a side view of the stuffing box 110. In one aspect, as shown in FIG. 12, each of the bottom flanges 982a,b can extend along the full length of the lifting lugs 152a,b, respectively. In another aspect, each of the bottom flanges 982a,b extend only partially along the length of the lifting lugs 152a,b, respectively. In one aspect, each of the lifting lugs 152a,b and the bottom flanges 982a,b can comprise non-curved edges when viewed from the side as shown. In another aspect, each of the lifting lugs 152a,b and the bottom flanges 982a,b can comprise at least one curved edge so as to form a convex or concave shape when viewed from the side as shown.

One should note that conditional language, such as, among others, "can," "could," "might," or "may," unless specifically stated otherwise, or otherwise understood within the context as used, is generally intended to convey that certain examples include, while other examples do not include, certain features, elements and/or steps. Thus, such conditional language is not generally intended to imply that features, elements and/or steps are in any way required for one or more particular examples or that one or more particular examples necessarily include logic for deciding, with or without user input or prompting, whether these features, elements and/or steps are included or are to be performed in any particular example.

It should be emphasized that the above-described examples are merely possible examples of implementations, merely set forth for a clear understanding of the principles of the present disclosure. Many variations and modifications may be made to the above-described example(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A valve assembly comprising: a valve body; a gate inside the valve body, the gate configured to control fluid flow; a stem configured to move the gate; a stem actuator connected to the stem, the stem actuator configured to rotate the stem; and a stuffing box attached to the valve body configured to form a seal around the stem, the stuffing box comprising a stuffing box body and a lifting lug extending from the stuffing box body, the lifting lug fixed in position relative to the valve body, and wherein the lifting lug defines a lifting bore defining a closed shaped profile configured to lift the valve assembly; wherein the stem actuator is positioned above the lifting lug.

2. The valve assembly of claim 1, wherein a box stem bore of the stuffing box is aligned with a vertical axis of the valve assembly.

3. The valve assembly of claim 1, further comprising a bonnet mounted to the valve body, the stuffing box mounted on the bonnet.

4. The valve assembly of claim 3, wherein the stuffing box and the bonnet define a clearance gap therebetween.

5. The valve assembly of claim 1, wherein the lifting lug extends horizontally from the stuffing box body past a radially outermost portion of an operating nut of the valve assembly.

6. The valve assembly of claim 1, wherein the lifting lug is a first lifting lug, the stuffing box further comprising a second lifting lug extending from the stuffing box body and defining a second lifting bore defining a closed-shape profile.

7. The valve assembly of claim 6, wherein the first lifting lug and the second lifting lug are symmetrical about an axis of the valve assembly.

8. The valve assembly of claim 1, wherein the valve body further comprises a plurality of anti-rotation notches, each anti-rotation notch comprising:

a clearance portion configured to allow a shaft of a T-bolt to pass through by a long edge of the shaft; and an anti-rotation portion configured to hold a head of the T-bolt in place and to prevent the T-bolt from rotating during installation;

wherein the anti-rotation notches and the T-bolts are configured to secure the valve assembly to an adjacent component of a fluid system.

9. A stuffing box for a valve assembly comprising:
a stuffing box body;
a stem bore defined through the stuffing box body; and
a lifting lug extending from the stuffing box body;
wherein the lifting lug defines a lifting bore defining a closed-shape profile, the lifting lug configured to support the entire weight of the valve assembly, the lifting lug configured to be positioned between a stem actuator and a valve body of the valve assembly.

10. The stuffing box of claim 9, wherein the lifting lug defines a box stem bore and a lifting bore offset horizontally from the box stem bore.

11. The stuffing box of claim 9, wherein the lifting lug is a first lifting lug, the valve assembly further comprising a second lifting lug extending from the stuffing box body and defining a second lifting bore defining a closed-shape profile.

12. The stuffing box of claim 9, further comprising a bottom flange extending downward from a bottom surface of the lifting lug.

13. The stuffing box of claim 12, wherein the bottom flange comprises straight edges when viewed from the side.

14. A method for lifting a valve assembly, the valve assembly comprising a valve body and a stuffing box attached to the valve body, the stuffing box comprising a stuffing box body, a gate inside the valve body, the gate configured to control fluid flow, a stem configured to move the gate, a stem actuator connected to the stem, the stem actuator configured to rotate the stem, and a lifting lug extending from the stuffing box body, the lifting lug defines a lifting bore defining a closed-shape profile and is fixed in position relative to the valve body, wherein the stem actuator is positioned above the lifting lug, the method comprising:
attaching a lifting mechanism to the lifting lug of the valve assembly by passing a portion of the lifting mechanism through the lifting bore; and lifting the valve assembly with the lifting mechanism.

15. The method of claim 14, further comprising positioning a valve box over a portion of the valve assembly, an inner surface of the valve box positioned radially outward from an outermost portion of the lifting lug.

* * * * *